United States Patent
Angelsmark et al.

(10) Patent No.: US 8,977,889 B2
(45) Date of Patent: Mar. 10, 2015

(54) METHOD FOR INCREASING RELIABILITY IN MONITORING SYSTEMS

(75) Inventors: Ola Angelsmark, Ystad (SE); Fredrik Nyberg, Lund (SE); Bjarne Rosengren, Sodra Sandby (SE)

(73) Assignee: Axis AB, Lund (SE)

( * ) Notice: Subject to any disclaimer, the term of this patent is extended or adjusted under 35 U.S.C. 154(b) by 282 days.

(21) Appl. No.: 13/529,523

(22) Filed: Jun. 21, 2012

(65) Prior Publication Data

US 2013/0007540 A1    Jan. 3, 2013

Related U.S. Application Data

(60) Provisional application No. 61/504,444, filed on Jul. 5, 2011.

(30) Foreign Application Priority Data

Jun. 30, 2011 (EP) .................................. 11172131

(51) Int. Cl.
G06F 11/00 (2006.01)
H04L 12/26 (2006.01)
H04L 12/24 (2006.01)
H04L 29/08 (2006.01)

(52) U.S. Cl.
CPC .......... *H04L 43/0817* (2013.01); *H04L 41/069* (2013.01); *H04L 43/10* (2013.01); *H04L 67/1097* (2013.01); *H04L 67/025* (2013.01)
USPC ................ 714/6.1; 709/224; 714/48; 714/55; 714/56; 714/57

(58) Field of Classification Search
USPC .................... 714/6.1, 48, 55, 56, 57; 709/224
See application file for complete search history.

(56) References Cited

U.S. PATENT DOCUMENTS

| 6,891,566 | B2 * | 5/2005 | Marchese | 348/211.3 |
| 6,972,681 | B2 * | 12/2005 | Matsuoka et al. | 340/541 |
| 8,185,964 | B2 * | 5/2012 | Marchese | 726/29 |
| 8,300,098 | B1 * | 10/2012 | Gruttadauria et al. | 348/143 |
| 2002/0003575 | A1 * | 1/2002 | Marchese | 348/231 |
| 2005/0132414 | A1 * | 6/2005 | Bentley et al. | 725/105 |
| 2005/0200714 | A1 * | 9/2005 | Marchese | 348/211.3 |

(Continued)

FOREIGN PATENT DOCUMENTS

| JP | 2003243186 A | 8/2003 |
| JP | 2004334739 A | 11/2004 |

(Continued)

OTHER PUBLICATIONS

Takeuchi et al.., Machine Translation of JP 2007036369, Feb. 8, 2007.*

(Continued)

*Primary Examiner* — Joshua P Lottich
(74) *Attorney, Agent, or Firm* — Volpe and Koenig, P.C.

(57) ABSTRACT

A method for decreasing the risk of monitoring data failing to be stored includes periodically sending a test message from the monitoring device to a Networked Storage Device, NSD, generating an NSD fail signal in the monitoring device if events following the sending of the test message indicates that the NSD is not operating properly, and sending, in response to the NSD fail signal, a fail message from the monitoring device for detection outside housing of monitoring device.

14 Claims, 4 Drawing Sheets

(56) References Cited

U.S. PATENT DOCUMENTS

| | | | |
|---|---|---|---|
| 2006/0031476 A1 | 2/2006 | Mathes et al. | |
| 2006/0059202 A1 | 3/2006 | Niimura | |
| 2008/0088695 A1* | 4/2008 | Lin et al. | 348/14.08 |
| 2008/0122938 A1* | 5/2008 | Broberg et al. | 348/222.1 |
| 2008/0180524 A1* | 7/2008 | Lin et al. | 348/143 |
| 2008/0303903 A1* | 12/2008 | Bentley et al. | 348/143 |
| 2010/0033577 A1* | 2/2010 | Doak et al. | 348/159 |
| 2010/0049844 A1* | 2/2010 | Ikeda | 709/223 |
| 2010/0212024 A1* | 8/2010 | Marchese | 726/27 |
| 2012/0327245 A1* | 12/2012 | Rehn et al. | 348/159 |

FOREIGN PATENT DOCUMENTS

| | | |
|---|---|---|
| JP | 2006086654 A | 3/2006 |
| JP | 2007036369 A | 2/2007 |

OTHER PUBLICATIONS

Axis Communications "Axis 221 Network Camera User's Manual Rev. 1" 2005, pp. 1-54.

* cited by examiner

METHOD FOR INCREASING RELIABILITY IN MONITORING SYSTEMS

TECHNICAL FIELD OF THE INVENTION

The present invention relates to a method for increasing the reliability of the storing of monitoring data in a monitoring system.

BACKGROUND OF THE INVENTION

Many surveillance or monitoring systems of today generates a lot of monitoring data from all types of sensors. Moreover, these systems are becoming more and more digitized and it is increasingly common to include video cameras in these systems. In order to be able to review events of interest the surveillance or monitoring data is recorded. Now, when most of the data is digital, the recording of the data implies storing the data in storage units. However, video data requires a lot of storage capacity for recording and a lot of bandwidth for transport of the data.

In order to solve the problem of the high demand of storage capacity the surveillance sensors and in particular the video cameras have been made more and more intelligent to avoid sending monitoring data of no interest and to avoid making the system store monitoring data of no interest. However, by only storing data of interest the system becomes more vulnerable when storage devices do not work properly or break down. This vulnerability is particularly severe as the system is instructed to store the important monitoring data only. This type of problems is typically overcome by providing redundant storage systems.

Moreover, small surveillance or monitoring systems are more common today than for a couple of years ago as the cost of the hardware required has become less expensive. However, providing redundant storage in such small system may result in an extra cost that the system owner would like to avoid.

SUMMARY OF THE INVENTION

A monitoring system is enabled to experience less risk of not being able to store important data even if redundant storage is not available.

In particular, a method for decreasing the risk of monitoring data failing to be stored comprises the acts of:

periodically sending a test message from the networked video camera to a Networked Storage Device, NSD, generating an NSD fail signal in the networked video camera if events following the sending of the test message indicates that the NSD is not operating properly, and sending, in response to the NSD fail signal, a fail message from the networked video camera for detection outside housing of networked video camera.

One advantage of this method is that the risk of not be able to store monitoring data on an NSD that is not operating correctly is decreased in that the operability is frequently checked. Further, by testing from the networked video camera the dual effect of detecting failure in the specific communication used for the storing and the independence from central monitoring management sites or devices is achieved.

In one embodiment, the sending of a fail message includes sending an electronic message to a predetermined address over a network in order to enable remotely alerting of a person maintaining the system including the networked video camera and the NSD. The advantage of this feature is that a failure may be attended to quite quickly.

In an alternative embodiment, the sending of a fail message includes generating a signal perceivable by a human and emitting the signal outside of the housing. This is advantageous for small systems including a few networked video cameras and may be only one NSD in that a person being active in the vicinity of a networked video camera easily are able to discover a fail message. Hence, the managing of the monitoring system is facilitated in that no technologically complex management systems are required.

According to one embodiment, the signal perceivable by a human is light and according to another embodiment the signal perceivable by a human is sound. These to embodiments may be combined.

In one embodiment, the test message is a status check message including a status request. The advantage of getting status information from the NSD is that an indication of a likelihood of a future failure to store monitoring data may be received even earlier and, thus, providing more time for fixing such problems.

In one embodiment, the test message is sent to the application layer of the NSD.

In a further embodiment, the test message is a message including a write instruction for writing data for test purpose only and if the write instruction fails the NSD is deemed not to operate properly.

One embodiment further comprises setting a timer in the monitoring camera when the test message is sent from the monitoring camera, and if the timer expires and no response has been received from the NSD, then the monitoring camera treats the NSD as if it is not operating properly and the NSD fail signal is generated.

In one embodiment, the periodicity of the sending of test messages is having a period of substantially an hour and in an alternative embodiment the periodicity of the sending of test messages is having a period of substantially a minute.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures, like reference characters designate like or corresponding parts throughout the several figures.

DETAILED DESCRIPTION OF EMBODIMENTS

Figure 1:
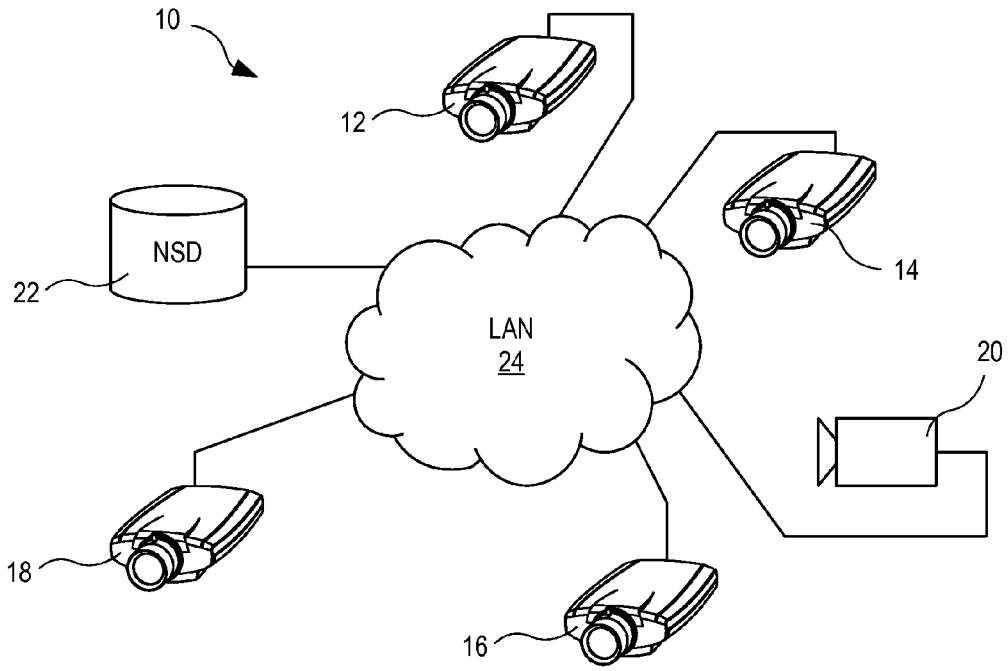
FIG. 1 is a schematic block diagram over a system, in which an embodiment of the invention may be implemented.

The present invention is implemented in a surveillance or monitoring system 10 including monitoring devices 12, 14, 16, 18, 20, and at least one Networked Storage Device (NSD) 22, all connected to each other via a network 24, see FIG. 1. The monitoring devices 12, 14, 16, 18, 20, may be networked video cameras, IR-cameras, IR-sensors, audio sensors, temperature sensors, etc., all of them generating monitoring data. The NSD 22 may be any type of networked storage device, e.g., a Network Attached Storage (NAS), a file server, a Storage Area Network (SAN). The network 24 may be any type of communication network, e.g., a Local Area Network (LAN), a Wide Area Network (WAN), the Internet, or any other wired or wireless network configuration.

Figure 2:
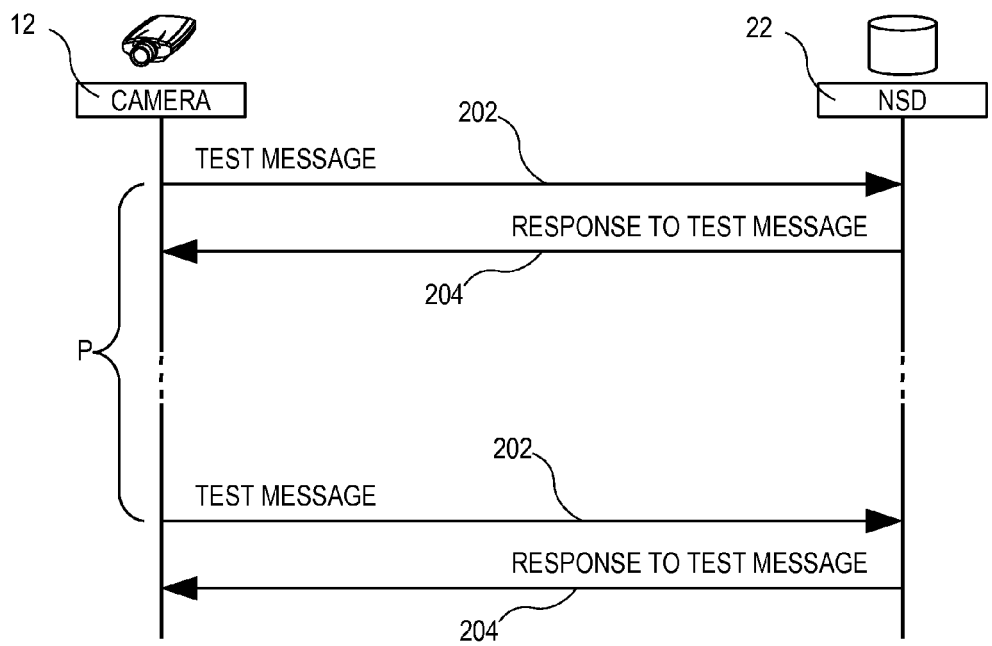
FIG. 2 is a timing diagram showing the communication and timing of messages in accordance with one embodiment of the invention.

According to one embodiment, a networked video camera 12 of the system is arranged to periodically send a test message 202 to a networked storage device NSD 22 to which it is configured to write monitoring data, see FIG. 2. The periodicity of the sending of the test message may be configured to send a test message at a rate, i.e., a period P, of about once every fraction of a second, once every minute, once every quarter of an hour, once every hour, or once every day. The periodicity may be highly dependent on the purpose of the monitoring and/or the environment monitored. If the application or environment requires a quick response, the time period between sending of test messages may be short (e.g., parts of seconds to a few minutes). However if the application or environment do not require quick response times then the time period between consecutive test messages may be longer (e.g., hours). If the NSD is operating properly, then a response 204 is returned from the NSD and received at the video camera.

Figure 3A:
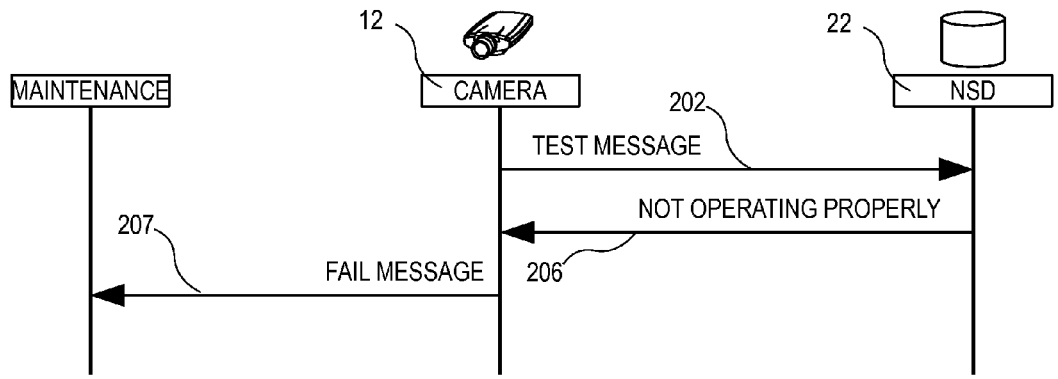
FIGS. 3a-3e show timing diagrams of example communication resulting in a detection of an NSD not functioning properly.

There are various responses from the NSD that may be interpreted as the NSD being non-operational, at least from the point of view of the networked video camera 12. For instance, see FIG. 3a, the response 206 may indicate that the NSD is not operating properly. This may be the case when the camera 12 sends a test message to the application layer of the NSD 22 requesting status information from the NSD 22. Such test message may for instance be an echo request and in response the camera may receive an erroneous echo message. When a response 206 is received at the camera 12 indicating that the NSD 22 is not operating properly, the camera may generate a fail message 207 and send this fail message 207 to a person or organization responsible for the maintenance of the system.

Figure 3B:
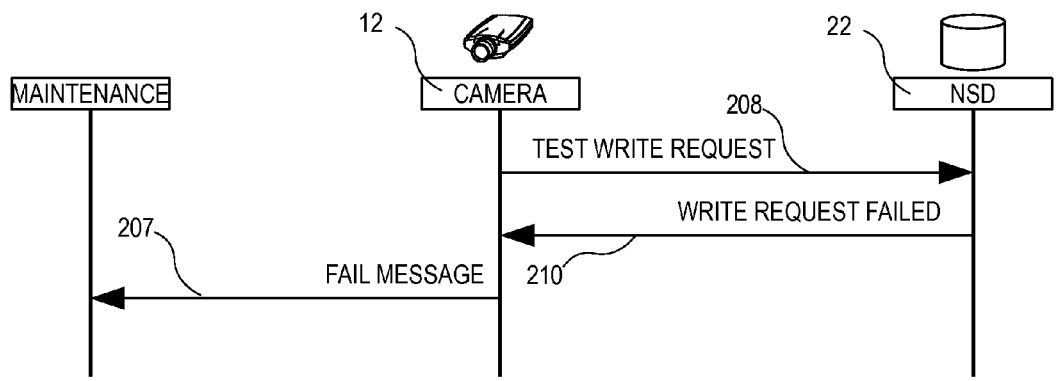

According to another example, the test message is a write request 208, see FIG. 3b, and the response 210 indicating non-operational NSD 22 may then be write request failed. In response to the write request failed, a fail message 211 is sent from the camera to the person/organization responsible for the maintenance of the system.

Figure 3C:
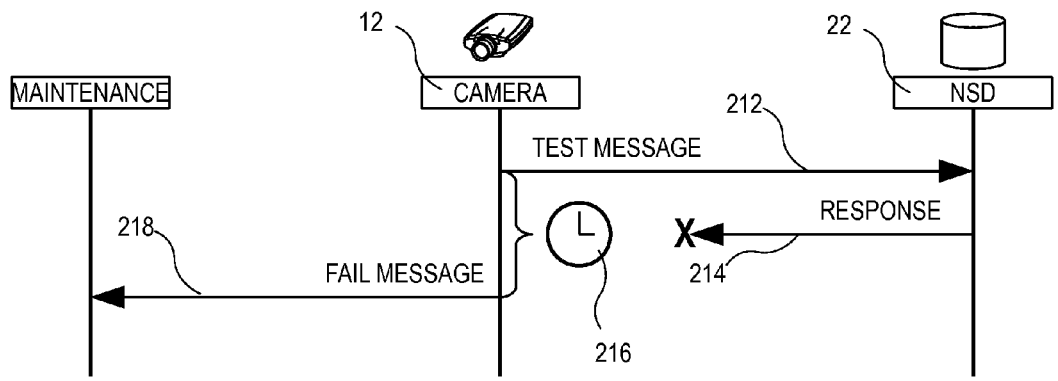
Figure 3D:
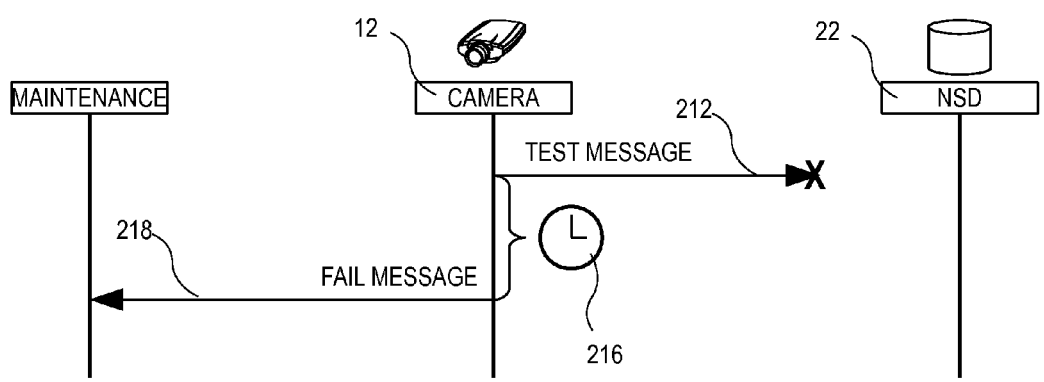

The failure are not necessarily originating from within the NSD 22, but may instead be related to the connection between the two devices, see FIG. 3c. Such errors will often be identified when a test message is sent 212 but no response 214 is returned. This may indicate that the network connection between the devices is malfunctioning or that the NSD 22 is non operational. In FIG. 3c, the test message 212 reaches the NSD 22, but the response 214 does not reach the camera 12. Alternatively, see FIG. 3d, the more likely scenario is that the test message 212 never reaches the NSD 22 if there are problems with the connection between the two devices. According to one embodiment, the detection of this type of errors is achieved by having the camera starting a timer 216. Then if the timer expires before a response is received at the camera the expiration of the timer indicates that the NSD 22 or the connection to the NSD 22 is non operational and the sending of a fail message 218 is triggered.

Figure 3E:
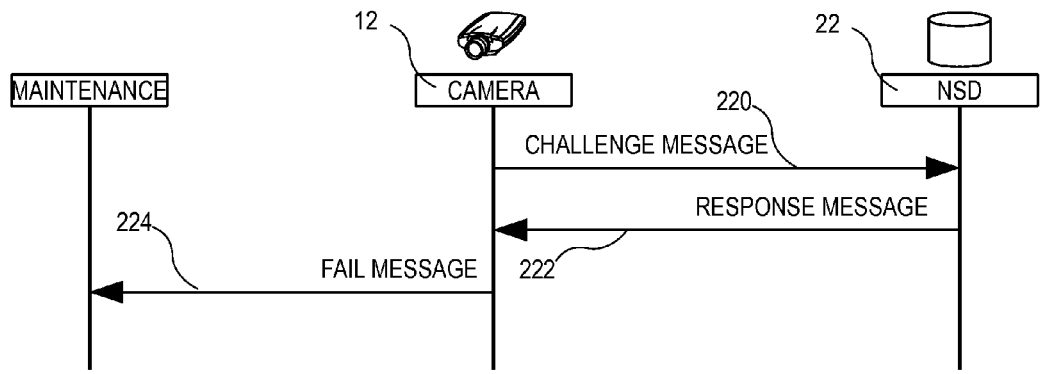

Further, as depicted in FIG. 3e, the test message may be a challenge message 220 forming part of the communication in a challenge-response authentication protocol. In these types of authentication protocols, a question (i.e., "challenge") is sent to another party which has to provide a valid answer, "response", in order to be authenticated. Hence, in response to the challenge message 220 sent from monitoring device 12 to the NSD 22, a response message 222 is sent from the NSD 22 to the monitoring device 12 mainly in order to authenticate the NSD 22 and thereby guarantee that the NSD 22 is the proper NSD and that the data stored will be accessible in the future. The monitoring device checks the response, and if the NSD 22 fails to be authenticated, then a fail message 224 is sent.

This challenge procedure, or any other test message, may be combined with use of the timer in order to check if the communication is working or if the NSD 22 is responsive. Moreover, in FIGS. 3a-e, it is shown that if the NSD 22 is non-operational, if the communication is failing, if the NSD 22 is not the correct NSD, or if any other test of the NSD 22 is failing, then the monitoring device 12 generates and sends an electronic fail message 207, 218, 224, over the network. The fail message 207, 218, 224 may be addressed to a system enabling contact with a person capable of maintenance or to a system enabling automatic reconfiguration of the storing scheme of the monitoring device 12.

According to another embodiment, the monitoring device 12 may, in addition to or instead of sending the electronic fail message 207, 218, 224 over the network, send the fail message as light or sound originating from the monitoring device 12. For example, a light emitter and/or a speaker may be arranged in the monitoring device 12 in order to be activated in response to an NSD fail signal generated in the monitoring device.

Figure 4:
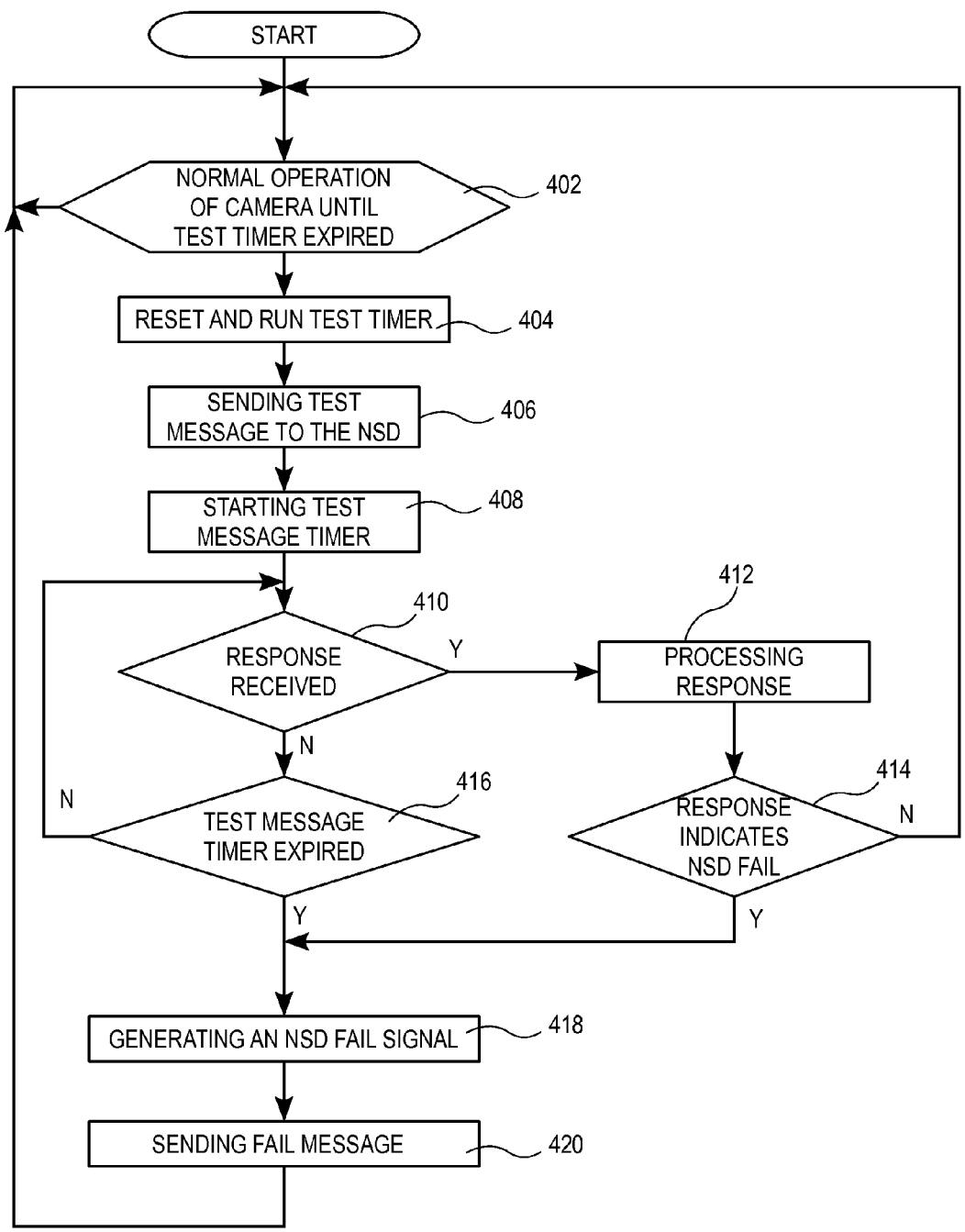
FIG. 4 is a flow chart of a method according to one embodiment.

In FIG. 4, the process of a networked camera according to one embodiment is described. The networked camera is arranged to periodically perform testing of an NSD which is set to be used by the camera for storage, step 402. The periodicity may be achieved by implementing a test timer in the camera and having the timer initiate a test process before it is reset, step 404, e.g., by having the test timer generate an interrupt signal upon expiration. When the test timer has expired and has been reset, the networked camera sends a test message to the NSD, step 406, and starts a test message timer, 408. The purpose of the test message timer is to enable detection of the NSD being non responsive or the connection between the networked camera and the NSD is broken in some way, as described in connection with FIGS. 3c-d.

During the time period when the test message timer is running, the networked camera checks for a response from the NSD, step 410. If a response is received, it is processed and interpreted in order to determine whether the NSD indicates any kind of failure or decrease in performance, step 412. If the response, step 414, does not indicate any failure or severe decrease in performance, then the process returns to step 402 waiting for next test event. However, if the response, step 414, does indicate a failure or severe decrease in performance in the NSD, then the process continues to step 418. Further, if no response is received before the test message timer expires, step 416, then the process also proceeds to step 418.

Accordingly, if the tests in steps 410-416 indicates that something is wrong with the NSD or the communication with the NSD, then a NSD fail signal is generated, step 418. Then the NSD fail signal triggers the sending of a fail message, 420. As previously mentioned, the fail message may be intended for maintenance persons or for an automatic system. Moreover, the fail message may be transmitted as an electronic message over the network to a person/organization responsible for the maintenance of the system (e.g., in a small system, this may be the owner of a business, it may be a support provider supporting the system, it may be a group of persons responsible for the maintenance, it may be an IT-department, etc.). Alternatively, this electronic message may be addressed to an automatic system arranged to solve these types of problems. Additionally, the fail message may be transmitted from the monitoring device as sound or light, e.g., by means of a light emitting device or a speaker, in order to make it possible for a human to perceive the fail message. The light signal may be a simple blinking or a fixed light and the sound signal may be some type of warning signal (e.g., a repeated beep, a continuous tone, etc.). Further, the fail message electronically transmitted of the network may include an indication that something is wrong and an indication of the nature of the problem. When the fail message is sent, the process returns to normal operation of the camera, step 402. However, as the camera has detected that the NSD is not operating properly, the camera may be set not to store monitoring data on the failing NSD during otherwise normal operation.

As depicted in the flowchart of FIG. 4, the camera may continue to send test messages to a failing NSD and resume storing on the NSD when the test communication does not indicate that the NSD is failing.

The inventive process may be implemented in the monitoring device by means of program code stored in the internal memory of the monitoring device or on an exchangeable medium. The program code is then processed by a processing unit of the monitoring device (e.g., a special purpose processor, a general purpose central processing unit, a micro processor, etc.), and by processing the program code, the monitoring device performs the functions of the invention. Alternatively, the process of the invention may be implemented using discrete components, Field-Programmable Gate Arrays (FPGA), or Application Specific Integrated Circuits (ASIC).

What is claimed is:

1. A method for decreasing the risk of monitoring data failing to be stored, the method comprising:
   periodically sending via a network connection a test message from a networked video camera to a Networked Storage Device (NSD), wherein the test message is configured to determine storage operability;
   generating an NSD fail signal in the networked video camera if events following the sending of the test message indicates that the NSD is not operating properly; and
   sending, in response to the NSD fail signal, a fail message from the networked video camera for detection outside a housing of the networked video camera.

2. The method according to claim 1, wherein the sending of a fail message includes sending an electronic message to a predetermined address over a network in order to enable remotely alerting of a person maintaining a system including the networked video camera and the NSD.

3. The method according to claim 1, wherein the sending of a fail message includes generating a signal perceivable by a human and emitting the signal outside the housing.

4. The method according to claim 3, wherein the signal perceivable by a human is light.

5. The method according to claim 3, wherein the signal perceivable by a human is sound.

6. The method according to claim 1, wherein the test message is a status check message including a status request.

7. The method according to claim 1, wherein the test message is sent to the application layer of the NSD.

8. The method according to claim 1, wherein the test message is a message including a write instruction for writing data for test purpose only and if the write instruction fails the NSD is deemed not to operate properly.

9. The method according to claim 1, further comprising:
   setting a timer in the networked video camera when the test message is sent from the networked video camera; and
   if the timer expires and no response has been received from the NSD, then the networked video camera treats the NSD as if the NSD is not operating properly and the NSD fail signal is generated.

10. The method according to claim 1, wherein the periodicity of the sending of test messages is having a period of substantially an hour.

11. The method according to claim 1, wherein the periodicity of the sending of test messages is having a period of substantially a minute.

12. A method for decreasing the risk of monitoring data failing to be stored, the method comprising:
   periodically sending via a network connection a test message from a networked video camera to a Networked Storage Device, NSD, wherein the test message is a status check message including a status request,
   generating an NSD fail signal in the networked video camera if events following the sending of the test message indicates that the NSD is not operating properly, and
   sending, in response to the NSD fail signal, a fail message from the networked video camera for detection outside a housing of the networked video camera.

13. A method for decreasing the risk of monitoring data failing to be stored, the method comprising:
   periodically sending via a network connection a test message from a networked video camera to a Networked Storage Device, NSD, wherein the test message is sent to the application layer of the NSD,
   generating an NSD fail signal in the networked video camera if events following the sending of the test message indicates that the NSD is not operating properly, and
   sending, in response to the NSD fail signal, a fail message from the networked video camera for detection outside a housing of the networked video camera.

14. A method for decreasing the risk of monitoring data failing to be stored, the method comprising:
   periodically sending via a network connection a test message from a networked video camera to a Networked Storage Device, NSD, wherein the test message is a message including a write instruction for writing data for test purpose only and if the write instruction fails the NSD is deemed not to operate properly,
   generating an NSD fail signal in the networked video camera if events following the sending of the test message indicates that the NSD is not operating properly, and sending, in response to the NSD fail signal, a fail message from the networked video camera for detection outside a housing of the networked video camera.

\* \* \* \* \*